US006411947B2

(12) United States Patent
Rice et al.

(10) Patent No.: US 6,411,947 B2
(45) Date of Patent: *Jun. 25, 2002

(54) AUTOMATIC MESSAGE INTERPRETATION AND ROUTING SYSTEM

(75) Inventors: Amy Rice, Ridgefield, CT (US); Julie Hsu, Brooklyn, NY (US)

(73) Assignee: Brightware, Inc., Novato, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/054,233

(22) Filed: Apr. 2, 1998

Related U.S. Application Data (60) Provisional application No. 60/042,656, filed on Apr. 4, 1997, and provisional application No. 60/042,494, filed on Apr. 3, 1997.

(51) Int. Cl.[7] .............................................. G06F 17/00
(52) U.S. Cl. .............................. 706/47; 706/46; 706/49
(58) Field of Search ........................... 709/206; 706/45, 706/46, 47, 49

(56) References Cited

U.S. PATENT DOCUMENTS

| | | | | |
|---|---|---|---|---|
| 5,283,856 A | * | 2/1994 | Gross et al. ................... | 706/47 |
| 5,377,354 A | * | 12/1994 | Scannell et al. .............. | 706/45 |
| 5,440,624 A | * | 8/1995 | Schoof, II .................... | 379/202 |
| 5,627,764 A | * | 5/1997 | Schutzman et al. ......... | 709/207 |
| 5,948,058 A | * | 9/1999 | Kudoh et al. ................ | 709/206 |
| 6,021,181 A | * | 2/2000 | Miner et al. ............. | 379/88.23 |
| 6,034,970 A | * | 3/2000 | Levac et al. ................. | 370/466 |
| 6,073,142 A | * | 6/2000 | Geiger et al. ................ | 707/500 |

OTHER PUBLICATIONS

Microsoft Corporation, Getting Results with Microsoft Office 97, 375–81, Jun. 1995.*
Pollock, A rule based message filtering system, ACM TOIS, pp 232–254, vo. 6, No. 3, Jul. 1988.*
Finin et al, "KQML as an agent communication lanaguage", ACM CIKM, pp 456–463, Mar. 1994.*
Thomas et al, "Using agents to personlize th eweb", ACM IUI, pp. 53–60, Aug. 1996.*
Boone, "Concept features in re–agent an intelligent email agent", ACM AA, pp 141–148, Jan. 1998.*

* cited by examiner

Primary Examiner—Kakali Chaki
Assistant Examiner—Anil Khatri
(74) Attorney, Agent, or Firm—Merchant & Gould P.C.

(57) ABSTRACT

A method for automatically interpreting an electronic message, including the steps of (a) receiving the electronic message from a source; (b) interpreting the electronic message using a rule base and case base knowledge engine; and (c) classifying the electronic message as at least one of (i) being able to be responded to automatically; and (ii) requiring assistance from a human operator. The method for automatically interpreting an electronic message may also include the step of retrieving one or more predetermined responses corresponding to the interpretation of the electronic message from a repository for automatic delivery to the source.

66 Claims, 3 Drawing Sheets

AUTOMATIC MESSAGE INTERPRETATION AND ROUTING SYSTEM

CROSS REFERENCE TO RELATED APPLICATIONS

This application is based on and claims priority from U.S. patent application Ser. No. 08/853,074 filed May 8, 1997 entitled "AUTOMATIC MESSAGE INTERPRETATION AND ROUTING SYSTEM, U.S. Provisional Patent Application No. 60/042,494, filed Apr. 3, 1997, entitled ELECTRONIC ROUTER FOR E-MAIL, and U.S. Provisional Patent Application No. 60/042,656, filed Apr. 4, 1997, entitled ELECTRONIC ROUTER FOR E-MAIL, each of which are incorporated herein by reference for all purposes.

BACKGROUND OF THE INVENTION

1. Field of the Invention

The present invention relates to a system for automatically interpreting an incoming data message and, more particularly, the invention relates to a system using combined rule based and case based reasoning in interpreting, classifying, categorizing, prioritizing and responding to electronic messages.

2. Related Art

Many businesses have recently sought to expand access to their products and services by using the Internet and other on-line information channels to reach current and potential customers. Indeed, marketing campaigns which solicit customers over on-line information channels using electronic messages are becoming increasingly popular. These marketing campaigns have become very successful and often customers also contact a business concern using electronic messages (for example, E-mail) to request, among other things, product information, account status, and access to products and services.

Businesses have experienced problems in adapting their business practices to respond to large volumes of incoming electronic messages transmitted over a variety of communications channels (e.g., the Internet, telecommunications channels, and the like). These businesses have had to develop methods for quickly, accurately and efficiently responding to the increased volume of incoming electronic messages in order to meet the demands of their customers. In the case of the banking industry, electronic commerce laws may require a bank to respond to certain types of electronic correspondence within a specified period.

The problems imposed on businesses in formulating methods to quickly respond to electronic messages will only be exacerbated as the use of on-line information channels and electronic messaging increases in the future.

Some businesses have responded to increases in incoming electronic messages by having employees work longer hours or employing more people to review and respond to the messages. These methods have the drawbacks of significantly increasing the business costs associated with hiring, training and/or compensating personnel as well as requiring an increase in capital equipment and office space.

An event driven rule based messaging system, see U.S. Pat. No. 5,555,346 to Gross et al., has been described which employs user specified "when-if-then" rules to manage incoming E-mail messages. The system provides a user with such features as a tickler (permitting the user to put off dealing with the E-mail for a specified period), an automatic forwarding feature, and an automatic replying feature. The forwarding and replying features are triggered by one or more of the form of the message, the source of the message and key words used in the body of the message. For example, when a recipient of E-mail will be out of the office, he or she may specify that any E-mail received from T. Jones should be automatically responded to with the message "I'm out of the office until June 1, see L. White if you need something immediately."

Unfortunately, the rule based messaging system described in U.S. Pat. No. 5,555,346 has several drawbacks. For example, that system requires that the recipient of the E-mail know the identity of the sender (i.e., the sender is predetermined by the user) and, therefore, would be non-responsive to E-mail coming from new customers. Further, because the so-called automatic response is not capable of being altered in accordance with the message content of each incoming E-mail, the response must be overly simple, overly broad or require that a further response be formulated by another individual.

Software coded systems for executing procedural rules using well known computer languages, for example, COBOL are not well suited for implementing a knowledge-based system for interpreting incoming electronic messages. Indeed, such procedural rules would require impractically large and complicated branched coding structures to respond to the unpredictable and intricate content of the incoming electronic messages.

Natural language processing products such as SRA or Logicon or augmented transition network in custom developed applications such as the Intelligent Banking System (see Sahin, K. and Sawyer, K. THE INTELLIGENT BANKING SYSTEM: NATURAL LANGUAGE PROCESSING FOR FINANCIAL COMMUNICATIONS. Innovative Applications of Artificial Intelligence, AAAI Press. 1989) are unsuited for producing a response to an incoming electronic message. Indeed, such systems have relatively limited sets of key linguistic clues which are expressible in rule form. Consequently such systems might only provide a pre-processor function to a classification or reasoning task at great expense and complexity.

A help desk application utilizing a case based reasoning system, see U.S. Pat. No. 5,581,664 to Allen et al., has been described which compares an incoming set of facts (a "Problem") with a stored set of exemplar cases (a case base). The system then performs the same action for the problem as was performed in connection with the stored case. The case base is stored in the form of case attributes representing past "problems." The case attributes are compared to the facts of the incoming problem using trigram character matching to obtain a set of prior cases which may be useful in formulating an appropriate action.

Unfortunately, the help desk application described in U.S. Pat. No. 5,581,664 has several drawbacks. For example, a user must interact with the system to narrow down the results of the case base search to obtain the "best" case match. Consequently, the system would not provide satisfactory results if the input to the system was an electronic message and no user interaction was provided. Further, the system is not capable of automatically responding to the sender of an electronic message. Indeed, a representative or the user must interactively interpret the set of cases retrieved from the case base to obtain a response to the "problem."

Accordingly, there is a need in the art for a system which overcomes the shortcomings of the prior art by receiving electronic messages, classifying and categorizing the messages, and automatically responding to the messages without the intervention of a human operator.

SUMMARY OF THE INVENTION

The process of reviewing electronic messages involves complex reasoning which is distinctly knowledge specific. The present invention was developed in a banking industry context and was based on domain specific knowledge of banking products and services. It is understood that the present invention is not limited to the banking industry context and that one skilled in the art could readily adapt the teachings herein to other industries.

It is understood that a manual process for classifying and formulating responses to ambiguous and/or new electronic messages requires experience and often the collective experience of several members of a business team. Human electronic message reviewers read each message from beginning to end while continuously evolving a final interpretation by recursively applying business knowledge to the content of the message.

Therefore, the method and system of the present invention emulates the recursive nature of evolving interpretation by utilizing a knowledge base to execute reasoning tasks which automatically classify incoming electronic messages and automatically obtain responses to the messages.

In order to overcome the disadvantages of the prior art, the method of the present invention includes a method for automatically interpreting an electronic message including the steps of (a) receiving the electronic message from a source; (b) interpreting the electronic message using a rule base and case base knowledge engine; and (c) classifying the electronic message as at least one of (i) being able to be responded to automatically; and (ii) requiring assistance from a human operator.

According to another aspect, the present invention includes a method for automatically interpreting an electronic message including the steps of (a) receiving the electronic message from a source; (b) interpreting the electronic message using a rule base and case base knowledge engine; and (c) retrieving one or more predetermined responses corresponding to the interpretation of the electronic message from a repository for automatic delivery to the source.

Other features and advantages of the present invention will become apparent from the following description of the invention which refers to the accompanying drawings.

BRIEF DESCRIPTION OF THE DRAWINGS

For the purpose of illustrating the invention, there is shown in the drawing a form which is presently preferred, it being understood, however, that the invention is not limited to the precise arrangement and instrumentality shown.

DESCRIPTION OF THE PREFERRED EMBODIMENT

Figure 1:
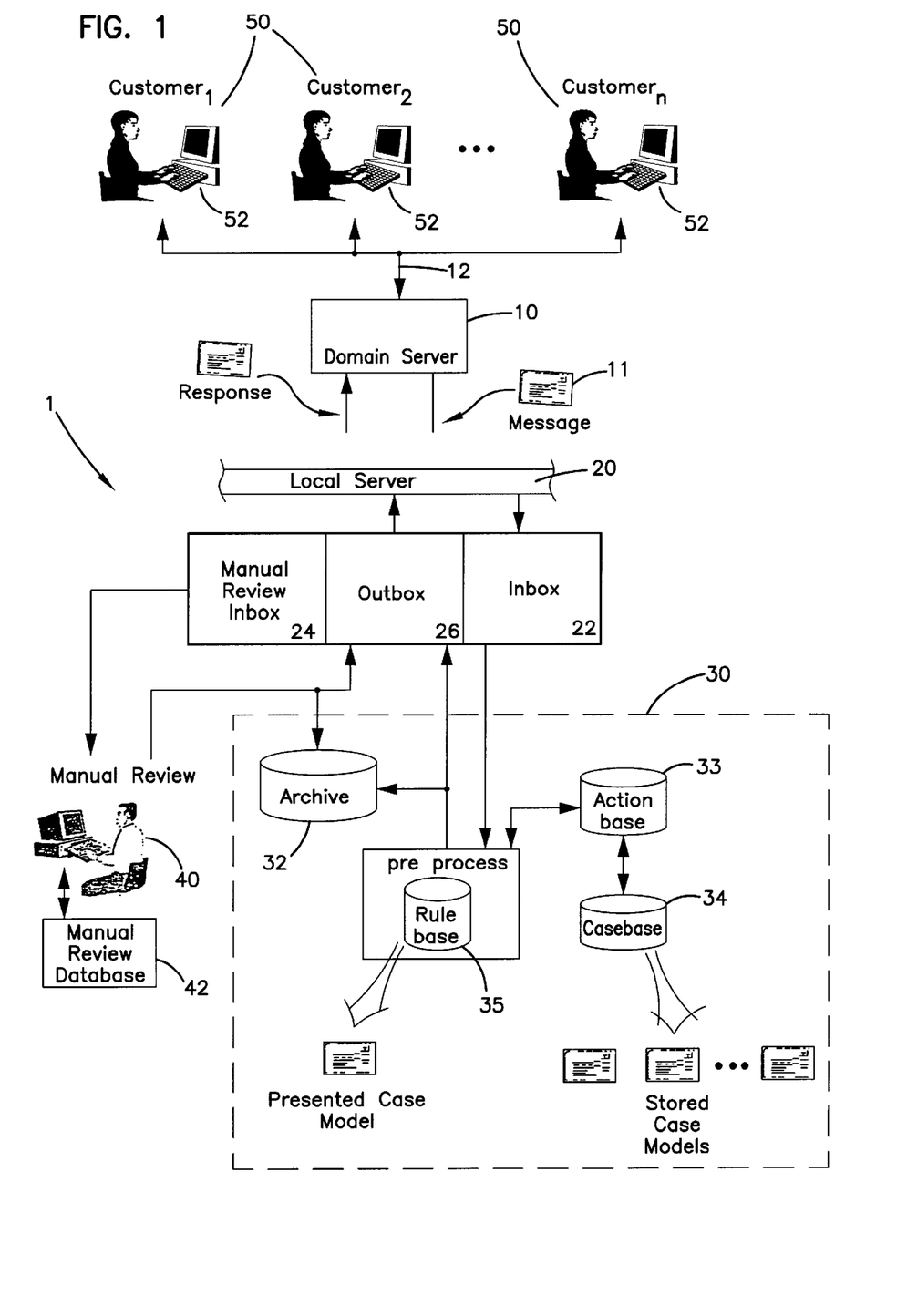
FIG. 1 is a block diagram showing the automatic message interpreting and routing system of the preferred embodiment of the present invention.

Referring now to the drawings wherein like numerals indicate like elements, there is shown in FIG. 1 a block diagram of the automatic message interpreting and routing system 1 of the preferred embodiment of the present invention. The system includes a domain server 10, a local server 20, and an automatic message reader 30.

The automatic message interpreting and routing system 1 also includes a manual reviewer (or human operator) 40 having access to a manual review data base 42. A plurality of customers 50 transmit electronic messages 11 to the automatic message interpreting and routing system 1 via source computers 52 coupled to the domain server 10. The domain server 10 preferably communicates with the local server 20 which communicates with an inbox storage device 22 for receiving the electronic messages 11 and an outbox 26. It is preferred that the electronic messages 11 are E-mail messages and are so referred to herein, it being understood, however, that other types of electronic messages 11 are contemplated as being within the scope of the invention.

The automatic message reader 30 includes a an archive 32, an action base 33, a case base 34, and a rule base 35. The action base 33, case base 34 and rule base 35 communicate via an appropriate software control program (described below) which executes the steps necessary to achieve the routing and interpretation of incoming E-mail messages 11.

The automatic message reader 30 preferably includes an embedded artificial intelligence (AI) application operating between an E-mail system and a customer service department. The customer service department, for example, provides new products and services to current and potential customers and maintains existing products and services by interacting with current customers. The automatic message reader 30 is a tool to more efficiently process incoming E-mail messages 11 in the customer service department.

The AI reasoning component (or knowledge engine) of the automatic message reader 30 uses a hybrid approach, i.e., a data-driven forward chaining rule parser operating in conjunction with a case based reasoner. This hybrid reasoning approach reflects the actual interpretation process used by human message reviewers in a customer service department.

The AI application emulates the recursive nature of human interpretation by first detecting combinations of prominent words (or text) and patterns of text within an electronic message 11 using a character matcher (preferably including a trigram character matching algorithm). As discussed in more detail below, predetermined attributes (or features) may be detected in the electronic message 11 during the character matching process. When certain attributes are detected, corresponding flags are set which (i) may directly lead to the classification of the electronic message 11; and/or (ii) may be subsequently used in a case base search.

Figure 2A:
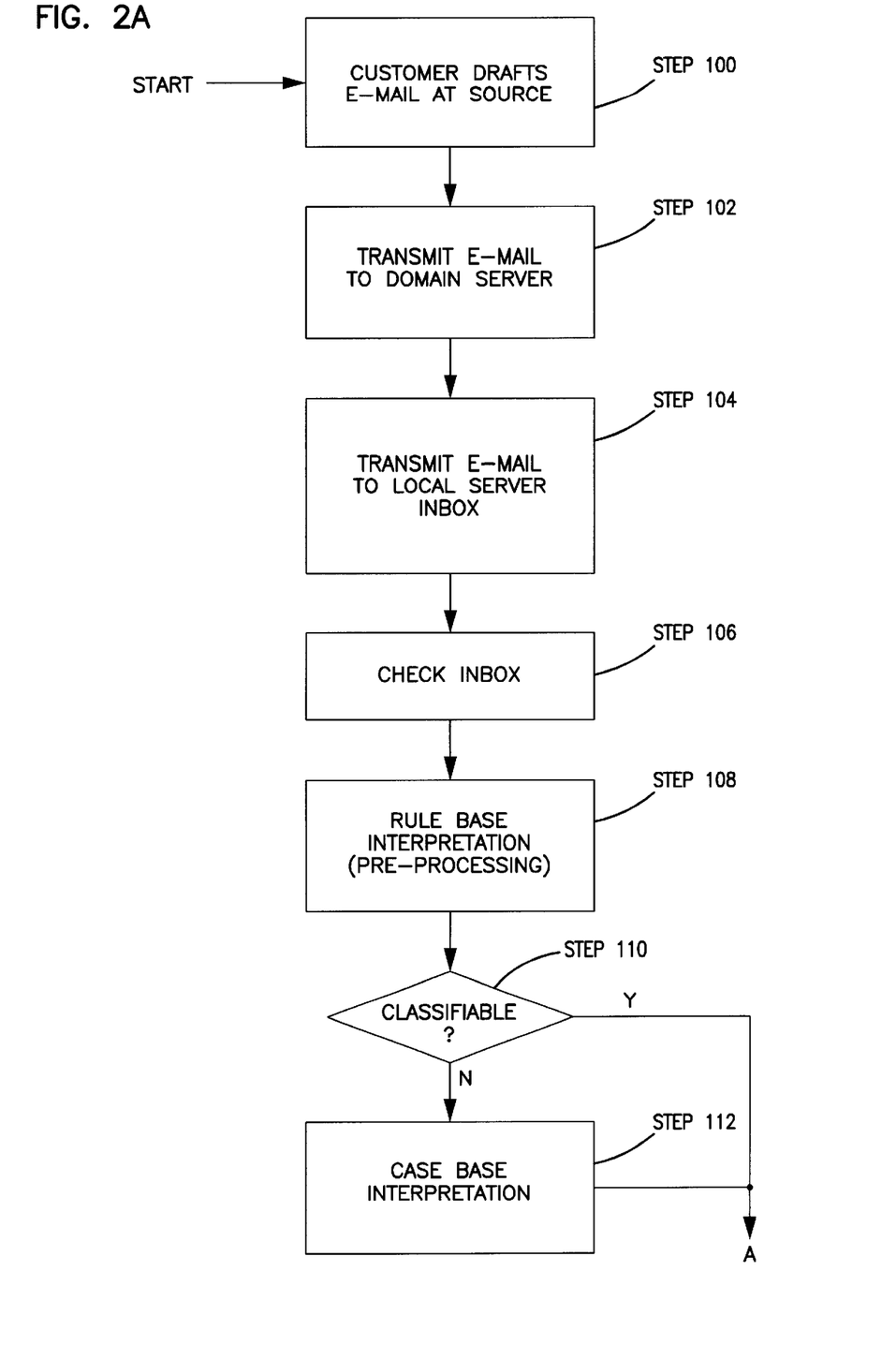
FIGS. 2A and 2B are flow diagrams showing the high level process flow of the automatic message interpreting and routing system of FIG. 1.
Figure 2B:
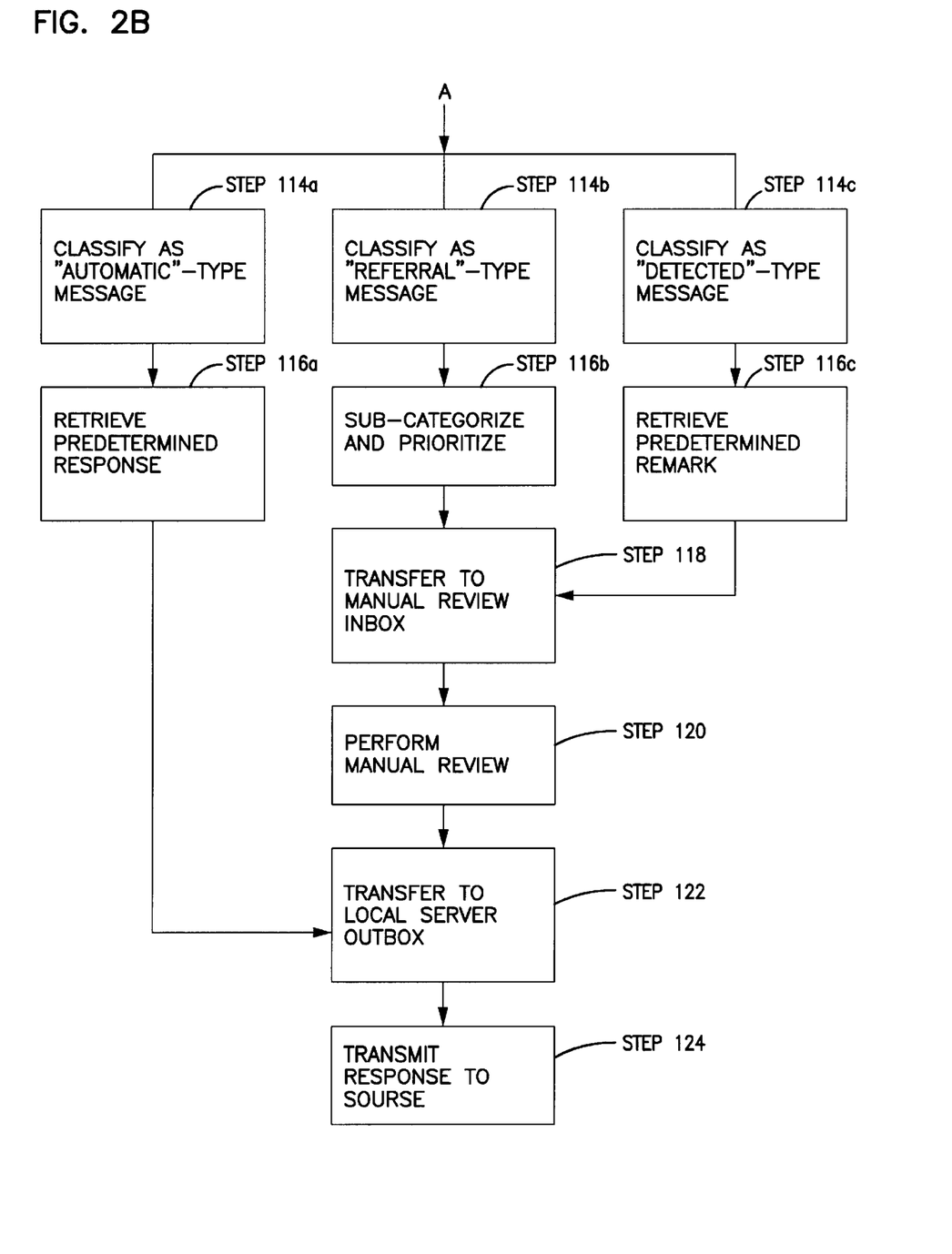

The high level process flow for the system of FIG. 1 for automatically interpreting and routing an electronic message 11 is now described with further reference to FIGS. 2A and 2B. At step 100, the customer so drafts an E-mail message 11 on the source computer 52 for transmission to a business concern employing the automatic message interpreting and routing system 1 of the present invention. The E-mail message 11 may include an inquiry and/or a statement for which the customer desires a response.

Unlike the help desk application of U.S. Pat. No. 5,581,664 described above, in the instant invention the data of the electronic message 11 is delivered to the automatic message interpreting and routing system 1 in a non-interactive manner. Specifically, the customer 50 transmits a non-interactive electronic message 11 to the system 1. This non-interactive transmission of electronic messages 11 prescribes that the customer 50 need not later provide additional input to assist the system 1.

It is noted that defining an electronic message 11 as being non-interactive prescribes only that the message content need not be supplemented. Thus, as described in more detail below, the form of the non-interactive electronic message 11 may be altered by the system 1 after the customer 50 sends it; however, the customer 50 is not required to provide supplemental information to assist the system 1.

At step 102 the customer transmits the E-mail message 11 from the source 52 to the domain server 10 over a communications channel 12. The domain server 10 communicates with the local server 20 (step 104) for routing the E-mail message 11 to the inbox storage device 22. A local server 20 suitable for use in the present invention is the Lotus Notes™ mail database system.

At step 106, the automatic message reader 30 periodically checks the inbox 22 for new E-mail messages 11. The automatic message reader 30 preferably includes an application programming interface (API) which is a rule based program (employing phase rules). The API facilitates data communications between the automatic message reader 30 (which, for example, runs with a Windows™ operating system) and the local server 20 (which, for example, runs with an OS2 operating system). Specifically, the API provides the following functions:

1. transferring data between the local server 20 and the automatic message interpreting and routing system 1;

2. retrieving E-mail messages 11 from the inbox 22 and delivering same to the automatic message reader 30;

3. delivering the E-mail messages 11 and any attachments (predetermined response and/or remarks) to the manual review inbox 24 and/or the outbox 26; and 4. marking a processed E-mail message 11 as having been processed by the automatic message reader 30.

The above processing steps and others will now be discussed in more detail. At step 106 the API of the automatic message reader 30 continuously monitors the inbox 22 for received E-mail messages 11 using a program loop. When a new E-mail message 11 has arrived, the automatic message reader 30 retrieves the E-mail message 11 and interprets it using a knowledge base capable of performing rule based parsing and case based retrieval (described in more detail below).

The interpretation of the E-mail message 11 by the automatic message reader 30 includes classifying the E-mail message 11 into (i) E-mail which is capable of being automatically responded to, called an "automatic" type E-mail message 11; and/or (ii) E-mail which is not capable of being automatically responded to and requires the assistance of the human operator 40, called a "referral" type E-mail message 11. Referral type E-mail messages 11 may also be of the "detected" type, which type of messages imply a particular manual handling procedure or require an interpretive aid for delivery to the human operator 40.

At step 108, a new E-mail message 11 is passed to the pre-processing block containing the rule base 35 of the knowledge engine. Preferably, the rule base 35 (and case base 34) are realized using the ART*Enterprise® tool, a knowledge-based application development tool, available from Brightware, Inc. of Stamford, Conn. The ART*Enterprise® tool employs a text pattern matcher having a Rete algorithm which provides the interpretation power necessary to process the highly complex message content of the E-mail message 11.

The rule base 35 of the automatic message reader 30 contains "question" rules which take the form of IF-THEN statements with a left hand side of the statement containing a condition (or set of conditions) and a right hand side of the statement containing conclusion(s) (or actions). For example, a typical rule will take the following form:

condition$_1$?, condition$_2$? . . . =>action$_1$, action$_2$ . . . .

When the condition(s) on the left hand side of the rule are satisfied (or true) then the rule "fires" and the action(s) are executed. It is noted that the condition(s) will be deemed satisfied regardless of the order in which they are found true (i.e., the sequencing of conditions is irrelevant). This more closely parallels the recursive nature of the message review process of a human and, therefore, it is preferred that the automatic message reader 30 employs this technique.

The left hand side conditions of the IF-THEN question rules contain the key linguistic clues that directly imply interpretive conclusions. These linguistic clues include literals, wild card patterns (e.g. text patterns), variables and segments, or choices of pattern sets. For example, if the business concern, ABC, Corp., employing the automatic message interpreting and routing system 1 of the present invention, were going to merge with XYZ Corp., any text reciting a "merger," and/or the "XYZ Corp" in a received E-mail message 11 is a linguistic clue as to the subject matter content of the E-mail message 11.

Question rules in the preferred embodiment of the present invention take on at least one of three forms, namely, (i) action setting rules, (ii) attribute setting rules, and (iii) action/attribute setting rules. Action rules are preferably received from the action base 33.

An action setting rule will cause a specific action to occur when the rule condition(s) are met. Depending on the detected conditions, the resulting action may include the final classification of the E-mail message 11 as "automatic" "referral" and/or "detected" (step 114, discussed in detail below). For example, when the condition that the body of the E-mail message 11 is blank is satisfied, then the action is preferably that the E-mail message 11 be classified as "automatic." Such an action rule would have the following form:

BLANK RULE:
  body contains no text?
  =>classify E-mail as "automatic."

An attribute setting rule is used when a satisfied condition is useful in subsequently matching the E-mail message 11 to stored case models of the case base 34 (step 112, described in more detail below). From the example above, one attribute of the E-mail message 11 could be assigned as any reference to the merger between ABC Corp. and XYZ Corp. Thus, an attribute setting question rule in the rule base 35 might be represented as follows:

MERGER RULE:
  text include "merger," or "XYZ Corp."?
  =>flag (set) merger attribute.

The application of the attribute setting rules produces a case model of the E-mail message 11 (i.e., an index of features useful in comparing the E-mail message 11 to the stored case models of the case base 34). Specifically, when attribute setting rules fire, specific attributes of the case model of the E-mail message 11 are flagged (i.e., set true). Thus, when a search of the case base 34 is required, the flagged attributes of the case model are used to search the stored case models of the case base 34.

An action/attribute setting rule is used when a satisfied condition indicates that the E-mail message 11 may be directly classified into one of the "automatic," "referred" and/or "detected" classifications and that one or more attributes should be set to aid in subsequently matching the E-mail message 11 to the stored case models of the case base. For example, if the customer sending the E-mail message 11 does not wish to be called on the telephone, then the classifying step should result in a "detected" type classification of the E-mail message 11 and that attribute should be set for aiding in searching the case base 34 (step 112, discussed below).

The following table lists a set of preferred question rules and the form (action, attribute or action/attribute) of each.

TABLE 1

(Question Rules)

| Question Rule Detects | Action Type: Classification |
|---|---|
| customer's address | attribute/action: detected |
| blank body | action: automatic |
| service cancellation | action: referral |
| change address | action: referral |
| no call back | attribute/action: detected |
| facsimile number | action: detected |
| phone number | action: detected |
| request for service | attribute |
| reference to error | attribute |
| investments | attribute |
| foreign country | attribute/action: detected |
| lengthy message | attribute |
| specific product | attribute |
| multiple questions | attribute |
| specific employee | attribute/action: detected |
| lost product | action: referral |
| sensitive info | action: refer, auto, detected |

At step 110, if the pre-processing interpretation using only the rule base 35 results in a classification of the E-mail message 11, then the process flow proceeds to step 114.

When the subject matter of the E-mail message 11 is substantially ambiguous and the pre-processing step using the rule base 35 alone does not result in a classification of the E-mail message 11, then at step 110 the automatic message reader 30 accesses the case base 34 (step 112).

Recall that the rule base (step 108) produces a case model of the E-mail message 11. The case model of the E-mail message 11 is called a "presented" case model and is compared with a set of stored case models in the case base 34. These stored case models are created from previously received E-mail messages 11 and associated responses. The case base 34 preferably contains over 300 stored case models.

Referring to TABLE 2 below, each stored case model of the case base 34 preferably includes a title section, a subject section, a description section, an action section, and an attribute section.

TABLE 2

| Example: Stored Case Model | |
|---|---|
| TITLE: | Lengthy Inquiry From lmnop.com |
| SUBJECT: | New Account |
| DESCRIPTION: | Dear Sirs, |
| |   I recently saw your advertisement in the newspaper. I am interested in learning whether or not your system would work for me. |
| |   Please E-mail me back and let me know the details of your system. |
| |                Thanks, |
| ACTIONS: | 1. type: referral |
| | 2. sub-class: sales |
| | 3. priority: 3 |

TABLE 2-continued

| Example: Stored Case Model | |
|---|---|
| ATTRIBUTES: | 1. address: yes |
| | 2. lengthy: yes |

The title and subject sections generally identify the stored case model. The description section of the stored case model contains the body of the previously sent E-mail messages 11 for comparison to the body of the presented case model.

It is noted that certain superfluous literals such as the author's address are removed from the description section of the stored case model. Instead, the attribute "address" is set to "yes" which indicates that an address was received. The proper removal of certain literals and the setting of attributes is very important in automatically interpreting the E-mail messages 11. Indeed, properly formed stored case models obviate the need to exactly match the presented case model and the stored case model.

The set of attributes (or slots) of the stored case model contain some important features of the prior received E-mail messages 11. For example, the attributes of the stored case model may include (1) a source's address; (2) a do not call request; (3) a request for service; (4) a reference to a foreign country; (5) a lengthy message; (6) a reference to a specific product and/or service; (7) a reference to multiple questions; and/or (8) a reference to a specific employee.

The attributes and description of the stored case model are searched vis-a-vis the attributes and description of a presented case model with the goal of finding a stored case model which has attributes and a description substantially matching the attributes and description of the presented case model. The automatic message reader 30 of the preferred embodiment of the present invention uses a trigram character matching algorithm which is available using the ART*Enterprise® tool.

In selecting the best stored case model vis-a--vis the presented-case model, the automatic message reader 30 searches each stored case model of the case base 34 and assigns a raw score to each stored case model. Each instance in which a piece of text, a combination of text, and/or a pattern of text of the presented case model matches the stored case model, the raw score of the stored case model is increased. When a piece of text, a combination of text, and/or a pattern of text of the presented case model does not match the stored case model, the raw score of the stored case model is not increased, and may be decreased.

The raw score of a stored case model may increase or decrease in differing amounts depending on the particular feature (i.e., attribute) being searched. Thus, if $feature_1$ matches, the raw score may increase by match-weight, while if $feature_2$ matches, the raw score may increase by match-$weight_2$. Similarly, if $feature_1$ does not match, the raw score may decreased by mismatch-$weight_1$, while if $feature_2$ does not match, the raw score may decrease by mismatch-$weight_2$. It is preferred that the match-weight of each feature is a positive number and that the mismatch-weight is zero.

The weight that any matched feature contributes to the raw score is most meaningful when the maximum possible match score between a particular presented case model and the stored case model is considered. This is so because different stored case models may contain different numbers of features. Accordingly, it is preferred that the automatic message reader 30 of the preferred embodiment of the present invention normalize the raw score by dividing the raw score by the maximum possible match score. Thus, the normalized scores of each stored case model vis-a-vis the presented case model are compared to select the "best" stored case model.

Preferably, a global absence weight (for example, −1) is also assigned to the stored case models of the case base 34. The contribution of the absence weight to the raw score of a stored case model is determined by multiplying the global absence weight by the number of features (or attributes) which are present in the presented case model but are absent from the stored case model. The raw score is then normalized as described above.

Once a best stored case model has been identified, the automatic message reader 30 infers that the same or similar action that was taken on the E-mail of the stored case model should be taken on the E-mail message 11 which produced the presented case model. For example, the classification of the stored case model may be assigned to the E-mail message 11 of the present case model.

At step 114, the E-mail message 11 is classified into at least one of an "automatic" (step 114a), a "referral" (step 114b), and/or a "detected" (step 114c) classification. As discussed above, the classification is achieved either through accessing only the rule base 35, or accessing both the rule base 35 and the case base 34.

When the automatic message reader 30 has classified the E-mail message 11 as being of the "automatic" type (step 114a), one or more predetermined responses (or prepared responses) are retrieved from a repository (or database), preferably the archive 32 (step 116a), of the automatic message reader 30 for automatic delivery to the source 52. As is evident from the discussion herein, the predetermined response is an appropriate response to the inquiry of the customer 50. It is understood that the predetermined response may be modified and/or altered in accordance with the interpretation of the E-mail message 11 if required to properly respond to a customer 50.

At step 122, the original E-mail message 11 and the predetermined response are routed from the automatic message reader 30 to the outbox 26 which communicates with the local server 20. The local server 20 then transfers the predetermined response to the domain server 10 for transmission to the source 52 over the communications channel 12 (step 124).

When the automatic message reader 30 is not capable of automatically responding to the E-mail message 11, the E-mail message 11 must be transferred to the human operator 40 for review. Thus, when the automatic message reader 30 classifies the E-mail message 11 as being of the "referral" type (step 114b), the automatic message reader 30 sub-categorizes the E-mail message 11 according to its subject matter content (step 116b) prior to transferring the E-mail message 11 to the human operator 40. The sub-categories are preferably related to specific business categories, such as (i) sales; and/or (ii) service.

At step 116b, the automatic message reader also assigns a priority (preferably including a priority number) to the sub-categorized E-mail message 11 where a higher priority indicates that the human operator 40 should process the associated E-mail message 11 before processing lower prioritized E-mail messages 11.

For example, through the rule based and case based reasoning discussed above, the automatic message reader 30 may interpret the subject matter content of an E-mail message 11 as being related to the product service sub-category. Within the product service sub-category, inquiries may be made relating to: (1) fraud and lost sensitive equipment (i.e., lost/stolen bank cards); (2) sensitive information (i.e., bank account information); (3) general information; and/or (4) user comments. It is preferred that a human operator 40 (dealing with the product service business sub-category) process a customer's inquiry into a fraud before other types of inquiries and, therefore, the fraud inquiry is assigned a highest level of priority. Conversely, a user comment is preferably given a lowest level of priority and may be processed last.

Alternatively, the automatic message reader 30 may interpret the subject matter content of an E-mail message 11 as being related to the product sales sub-category. Within the product sales sub-category, inquiries may be made relating to: (1) promotional content; (2) requests for services; and (3) general questions and/or lengthy messages. It is preferred that a human operator 40 (dealing with the product sales business sub-category) process a customer's inquiry into a promotional effort before other types of inquiries and, therefore, the promotional inquiry is assigned a highest level of priority. Conversely, a general question is preferably given a lowest level of priority and may be processed last.

It is noted that when the automatic message reader 30 has invoked a case base 34 search in classifying the E-mail message 11, and the best stored case model indicates that the E-mail message 11 is of the referral type, then the sub-categorization and priority of the stored case model will also be assigned to the E--mail message 11 of the presented case model. Further, if the best case model identifies a particular predetermined response, such response (or a modification thereof) may be utilized in responding to the E-mail message 11 of the presented case model.

After the referral type E-mail message 11 has been sub-categorized and prioritized, the automatic message reader 30 routs the E-mail message 11 to the manual review inbox 24 (step 118) for subsequent retrieval by the human operator 40. If possible, one or more predetermined responses for proposed release and delivery to the source 52 are retrieved from the repository of the automatic message reader 30 and routed to the manual review inbox 24 along with the E-mail message 11.

At step 120, the human operator 40 (preferably assigned to a specific business sub-category) first reviews and processes the highest priority E-mail messages 11 followed by the lower prioritized E-mail messages 11. When the human operator 40 deems that a predetermined response is appropriate and may be released to the customer 50, the response is routed to the outbox 26 (step 122) for delivery to the domain server 10. The response is then transmitted over the data communications channel 12 to the source 52 (step 124).

Preferably, all outgoing responses are archived in an archive database 32 for subsequent review and use if desired.

When the automatic message reader 30 interprets that the referral type E-mail message 11 is also of the "detected" type (step 114c), a particular manual handling procedure for a referred E-mail message 11 has been interpreted from the subject matter of the E-mail. In such a case, one or more remarks (i.e., an explicative aid or advice) for presentation to the human operator 40 may be extracted from the repository of the automatic message reader 30 (step 116c) and routed to the manual review inbox 24 along with the E-mail message 11 (step 118) to assist the human operator 40 in processing the E-mail message 11 in a more efficient manner.

For example, when the automatic message reader 30 interprets a do not call request, a phone number, a facsimile-number or a foreign address, in the E-mail message 11, it is preferred that a remark indicating a specific manual procedure (e.g., not calling the customer) be forwarded with the E-mail message 11 to the human operator 40. Other types of "detected" features of E-mail messages 11 include, specific employee requests, inclusion of sensitive information, and/or inclusion of other information which dictates a specific manual procedure.

Such "detected" E-mail messages 11 often contain information which is useful in customizing and improving customer service vis-a-vis the responses to the E-mail messages 11.

In some instances the response to the customer's 50 E-mail message 11 may not be affected by such "detected" information. However, a human operator 40 might otherwise miss the "detected" information in a strictly manual review process. Thus, a business concern benefits from the classification of "detected" type E-mail messages 11 in that valuable business tools for servicing customers 50 may be developed using the detected information.

Advantageously, the automatic message interpreting and routing system 1 of the preferred embodiment of the present invention can properly process electronic messages 11 from any number of unknown sources (i.e., the sources need not be predetermined). Indeed, since the automatic message reader 30 employs a knowledge engine to automatically interpret the subject matter content of the electronic message 11, the specific source of the electronic message 11 does not limit the set of electronic messages 11 which may be automatically responded to provided only that they arrive in a recognized format, like ASCII, etc.

The electronic message 11 is preferably an E--mail message in ASCII text data format, it being understood that the invention is not so limited. Indeed, the electronic message 11 may take on a variety of data formats including digital formats, voice data, dual tone multi-frequency (DTMF) tones, or the like. When the electronic message 11 is in the voice data format or DTMF data format, a receiving device (not shown) suitable for receiving the voice data and/or DTMF tones is included in the automatic message interpreting and routing system 1.

Further, the message data of the electronic message 11 may be converted from one data format to another prior to transferring the electronic message 11 to the inbox 22. For example, a customer 50 may transmit a printed document (message data) to the automatic message interpreting and routing system 1 by way of a facsimile machine. In that case, the facsimile format file would be converted using, for example, a character recognition process (not shown) which converts the facsimile formatted text into an ASCII data format electronic message 11 prior to transferring the electronic message 11 to the inbox 22.

The customer SO may also transmit an electronic message 11 in a voice data format to the automatic message interpreting and routing system 1 by way of known methods (e.g., dictation software such as is currently offered commercially from IBM). In such a case, the voice data is preferably converted into a digital text format electronic message 11, for example ASCII, prior to transferring the electronic message 11 to the inbox 22.

The system for automatically interpreting an incoming electronic message 1 is capable of interpreting electronic messages 11 which contain data in a predetermined arrangement, so-called fixed data electronic messages. An electronic message having fixed data may have the message content (i.e., the customer name, address, message content, etc.) in predetermined positions in the message.

The system for automatically interpreting an incoming electronic message 1 is also capable of interpreting electronic messages 11 which contain data in variable arrangements, so-called variable data. Such electronic messages having variable data may have the message content in any arrangement.

It is noted that a business concern may not wish to automatically send a predetermined response to a source 52 without first manually reviewing the response. In such a case, the system for automatically interpreting an incoming electronic message 1 of FIG. 1 would be modified such that all predetermined responses and/or remarks from the automatic message reader 30 are transferred to the manual review inbox 24. Thus, the process flow of FIG. 2B would be likewise modified such that the output from step 116a (retrieving a predetermined response) is directed to step 118 (transferring to the manual review inbox).

A working model of the system for automatically interpreting an incoming electronic message of the present invention has been developed which has significantly reduced costs of processing such messages. Specifically, about 5 to 80 percent (depending on the size and structure of the case base) of all incoming electronic messages were automatically processed while the processing time of those messages requiring manual intervention was reduced by about 50 percent.

The working system utilized the ART*Enterprise® version 2.0b, the Microsoft Win32s library, Visual C/C++1.5, and Lotus Notes™ version 3.0C running on a Windows 3.1 platform. The system employed an Intel-based 486/66 Mhz, 500 MB hard disk and 32 MB RAM computer.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method for automatically processing a non-interactive electronic message using a computer, comprising the steps of:
   (a) receiving the electronic message from a source;
   (b) interpreting the electronic message using a rule base and case base knowledge engine; and
   (c) classifying the electronic message as at least one of (i) being able to be responded to automatically; and (ii) requiring assistance from a human operator.

2. The method of claim 1, further comprising the step of:
   (d) retrieving one or more predetermined responses from a repository for automatic delivery to the source when the classification step indicates that the electronic message can be responded to automatically.

3. The method of claim 1, further comprising the steps of:
   (d) retrieving one or more predetermined responses from a repository, the predetermined responses being proposed for delivery to the source;
   (e) forwarding the electronic message and the predetermined response to the human operator when the classification step indicates that a response to the electronic message requires assistance from a human operator; and
   (f) delivering the predetermined response to- the source when the human operator deems the response appropriate.

4. The method of claim 3, further comprising the step of:
   (c1) further categorizing the electronic message into at least one of a plurality of sub-categories based on subject matter content of the electronic message.

5. The method of claim 4, wherein the sub-categories include product service subject matter and product sales subject matter.

6. The method of claim 4, further comprising the step of:
(c2) prioritizing the sub-categorized electronic message into at least one of a plurality of priorities based on the subject matter content of the electronic message wherein a higher priority indicates that the human operator should process the associated electronic message before processing lower prioritized electronic messages.

7. The method of claim 6, wherein the plurality of priorities of a product service sub-category include at least one of (i) fraud and lost products; (ii) sensitive information; (iii) general information; and (iv) user comments.

8. The method of claim 7, wherein the listed priorities are in order from highest to lowest priority.

9. The method of claim 6, wherein the plurality of priorities of a product sales sub-category include promotional content, request for services, and general questions and lengthy messages.

10. The method of claim 9, wherein the listed priorities are in order from highest to lowest priority.

11. The method of claim 1, wherein the step of classifying includes:
(c) classifying the electronic message as at least one of (i) being able to be responded to automatically; (ii) requiring a first level of assistance from a human operator; and (iii) requiring a second level of assistance from a human operator.

12. The method of claim 11, wherein:
when the classification step indicates that the electronic message requires a first level of assistance from a human operator, the method further comprises the steps of:
(d) retrieving one or more predetermined responses from a repository, the predetermined responses being proposed for delivery to the source;
(e) forwarding the electronic message and the predetermined response to the human operator; and
(f) delivering the predetermined response to the source when the human operator deems the response appropriate.

13. The method of claim 11, wherein:
when the classification step indicates that the electronic message requires a second level of assistance from a human operator, the method further comprises the steps of:
(d) retrieving one or more predetermined remarks from a remarks repository to assist the human operator in processing the electronic message manually; and
(e) forwarding the electronic message to the human operator.

14. The method of claim 13, wherein the classification step indicates that the electronic message requires a second level of assistance from a human operator when at least one of a phone number, a foreign address, a do not call request, a facsimile number, a specific employee request, sensitive information, and a specific manual procedure is interpreted in the electronic message.

15. The method of claim 1, wherein the electronic message is received over an electronic data communications channel.

16. The method of claim 15, wherein the electronic data communications channel is the Internet.

17. The method of claim 15, wherein the electronic message is an electronic mail (E-mail) message.

18. The method of claim 1, further comprising the steps of:

(a1) receiving the electronic message from the source in a first data format; and
(a2) converting the electronic message from the first data format to an electronic message having a second data format.

19. The method of claim 18, wherein the first data format is one of a printed document format, a voice data format, a dual tone multi-frequency (DTMF) format, and a first digital data format.

20. The method of claim 19, wherein the second data format is a second digital data format.

21. The method of claim 20, wherein the first and second digital data formats are ASCII.

22. The method of claim 1, wherein the predetermined response is altered in accordance the interpretation of the electronic message before delivery to the source.

23. The method of claim 1, wherein the electronic message includes fixed data.

24. The method of claim 1, wherein the electronic message includes variable data.

25. A method for automatically processing an electronic mail (E-mail) message, comprising the steps of:
(a) receiving the E-mail from a source over an electronic data communications channel;
(b) interpreting the E-mail using a rule base and case base knowledge engine; and
(c) classifying the E-mail as at least one of (i) being able to be responded to automatically; and (ii) requiring assistance from a human operator; wherein when the classification indicates that the E-mail can be responded to automatically, the method further includes the steps of:
(d) retrieving one or more predetermined responses from a repository;
(e) formulating an E-mail response from the predetermined response; and
(f) transmitting the E-mail response to the source over the data communications channel.

26. A method for automatically processing a non-interactive electronic message using a computer, comprising the steps of:
(a) receiving the electronic message from a source;
(b) interpreting the electronic message using a rule base and case base knowledge engine; and
(c) retrieving one or more predetermined responses corresponding to the interpretation of the electronic message from a repository for automatic delivery to the source.

27. The method of claim 26, wherein the source of the electronic message is not predetermined.

28. The method of claim 26, further comprising the steps of:
(b1) classifying the electronic message as at least one of (i) being able to be responded to automatically; and (ii) requiring assistance from a human operator; and
(c) retrieving one or more predetermined responses corresponding to the interpretation of the electronic message from a repository for automatic delivery to the source when the classification step indicates that the electronic message can be responded to automatically.

29. The method of claim 28, wherein the step of interpreting the electronic message further includes the steps of:
(b1) producing a case model of the electronic message including a set of predetermined attributes for identifying specific features of the electronic message;

(b2) detecting at least one of text, combinations of text, and patterns of text of the electronic message using character matching;

(b3) flagging the attributes of the case model which are detected in the electronic message; and (b4) classifying the electronic-message as at least one of (i) being able to be responded to automatically; and (ii) requiring assistance from a human operator, the classification being performed in accordance with the flagged attributes.

30. The method of claim 28, wherein the step of interpreting the electronic message further includes the steps of:

(b1) producing a case model of the electronic message including (i) a set of attributes for identifying specific features of the electronic message; and (ii) message text;

(b2) detecting at least one of text, combinations of text, and patterns of text of the electronic message using character matching;

(b3) flagging the attributes of the case model which are detected in the electronic message;

(b4) comparing the flagged attributes of the case model with stored attributes of stored case models of the case base;

(b5) comparing the text of the case model with stored text of the stored case models of the case base; and (b6) assigning a score to each stored case model which is compared with the case model, the score increasing when at least one of the attributes and the text match the stored case model and the score not increasing when at least one of the attributes and the text do not match the stored case model.

31. The method of claim 30, wherein:

when at least one of the attributes and the text match the stored case model, the score is increased by a predetermined match weight; and when at least one of the attributes and the text does not match the stored case model, the score is decreased by a predetermined mismatch weight.

32. The method of claim 31, wherein the match weight has an absolute value greater than zero and the mismatch weight is zero.

33. The method of claim 31, wherein each score is normalized by dividing the score by a maximum possible score for the stored case model, where the maximum possible score is determined when all of the attributes and text of the case model and the stored case model match.

34. The method of claim 30, further comprising the step of:

(b7) classifying the electronic message as at least one of (i) being able to be responded to automatically; and (ii) requiring assistance from a human operator, the classification of the electronic message being performed in accordance with the classification of the stored case model having a highest score.

35. The method of claim 34, further comprising the step of:

(c) retrieving one or more predetermined responses corresponding to the interpretation of the electronic message from a repository for automatic delivery to the source when the classification step indicates that the electronic message can be responded to automatically.

36. The method of claim 35, wherein the predetermined response is altered in accordance with the interpretation of the electronic message before delivery to the source.

37. The method of claim 30, wherein the attributes include at least one of a source's address, a do not call request, a request for service, a reference to a foreign country, a long message, a reference to a specific product, a reference to multiple questions, and a reference to a specific employee.

38. The method of claim 26, wherein the predetermined response is altered in accordance the interpretation of the electronic message before delivery to the source.

39. The method of claim 26, wherein the electronic message includes fixed data.

40. The method of claim 26, wherein the electronic message includes variable data.

41. A system for automatically processing a non-interactive electronic message received from a source, the system comprising:

a server for transmitting and receiving electronic messages over a communications channel;

an inbox storage device for storing incoming electronic messages;

a knowledge engine including a rule base and a case base, the case base having a plurality of stored cases representing past received electronic messages;

a pre-processor for receiving the electronic message and interpreting the electronic message using the rule base;

a searching device for searching the electronic message and the case base to retrieve a stored case from the case base which most closely matches the electronic message;

a classifier for classifying the electronic message into at least one of (i) being able to be responded to automatically; and (ii) requiring assistance from a human operator.

42. The system of claim 41, further comprising:

a repository of predetermined responses, at least one of the responses being selected from the repository by the knowledge base for automatic delivery to the source when the classifier indicates that the electronic message can be responded to automatically.

43. The system of claim 42, wherein the predetermined response is altered in accordance the interpretation of the electronic message before delivery to the source.

44. The system of claim 41, further comprising:

a repository of predetermined responses, one or more of the predetermined responses being selected by the knowledge base for proposed delivery to the source; and an electronic router for forwarding the electronic message to the human operator when the classifier indicates that a response to the electronic message requires assistance from a human operator, the router delivering the predetermined response to the source when the human operator deems the response appropriate.

45. The system of claim 44, wherein the classifier categorizes the electronic message into at least one of a plurality of sub-categories based on subject matter content of the electronic message.

46. The system of claim 45, wherein the sub-categories include product service subject matter and product sales subject matter.

47. The system of claim 45, wherein the classifier prioritizes the sub-categorized electronic message into at least one of a plurality of priorities based on the subject matter content of the electronic message wherein a higher priority indicates that the human operator should process the associated electronic message before processing lower prioritized electronic messages.

48. The system of claim 47, wherein the plurality of priorities of a product service sub-category include at least one of (i) fraud and lost products; (ii) sensitive information; (iii) general information; and (iv) user comments.

49. The system of claim 48, wherein the listed priorities are in order from highest to lowest priority.

50. The system of claim 47, wherein the plurality of priorities of a product sales sub-category include promotional content, request for services, and general questions and lengthy messages.

51. The system of claim 50, wherein the listed priorities are in order from highest to lowest priority.

52. The method of claim 41, wherein the electronic message includes fixed data.

53. The method of claim 41, wherein the electronic message includes variable data.

54. A method for automatically processing a non-interactive electronic message using a computer, comprising the steps of:
- (a) receiving the electronic message from a source;
- (b) interpreting the electronic message using a rule base and case base knowledge engine;
- (c) retrieving one or more predetermined responses from a repository, the predetermined responses being proposed for delivery to the source;
- (d) forwarding the electronic message and the predetermined response to a human operator; and
- (e) delivering the predetermined response to the source when the human operator deems the response appropriate.

55. The method of claim 54, further comprising the step of:
- (b1) categorizing the electronic message into at least one of a plurality of sub-categories based on subject matter content of the electronic message.

56. The method of claim 55, wherein the sub-categories include product service subject matter and product sales subject matter.

57. The method of claim 56, further comprising the step of:
- (b2) prioritizing the sub-categorized electronic message into at least one of a plurality of priorities based on the subject matter content of the electronic message wherein a higher priority indicates that the human operator should process the associated electronic message before processing lower prioritized electronic messages.

58. The method of claim 57, wherein the plurality of priorities of a product service sub-category include at least one of (i) fraud and lost products; (ii) sensitive information; (iii) general information; and (iv) user comments.

59. The method of claim 58, wherein the listed priorities are in order from highest to lowest priority.

60. The method of claim 57, wherein the plurality of priorities of a product sales sub-category include promotional content, request for services, and general questions and lengthy messages.

61. The method of claim 60, wherein the listed priorities are in order from highest to lowest priority.

62. The method of claim 54, wherein the step of interpreting the electronic message further includes the steps of:
- (b1) producing a case model of the electronic message including a set of predetermined attributes for identifying specific features of the electronic message;
- (b2) detecting at least one of text, combinations of text, and patterns of text of the electronic message using character matching; and
- (b3) flagging the attributes of the case model which are detected in the electronic message.

63. The method of claim 54, wherein the step of interpreting the electronic message further includes the steps of:
- (b1) producing a case model of the electronic message including (i) a set of attributes for identifying specific features of the electronic message; and (ii) message text;
- (b2) detecting at least one of text, combinations of text, and patterns of text of the electronic message using character matching;
- (b3) flagging the attributes of the case model which are detected in the electronic message;
- (b4) comparing the flagged attributes of the case model with stored attributes of stored case models of the case base;
- (b5) comparing the text of the case model with stored text of the stored case models of the case base; and
- (b6) assigning a score to each stored case model which is compared with the case model, the score increasing when at least one of the attributes and the text match the stored case model and the score not increasing when at least one of the attributes and the text do not match the stored case model.

64. The method of claim 63, wherein:
when at least one of the attributes and the text match the stored case model, the score is increased by a predetermined match weight; and
when at least one of the attributes and the text does not match the stored case model, the score is decreased by a predetermined mismatch weight.

65. The method of claim 64, wherein the match weight has an absolute value greater than zero and the mismatch weight is zero.

66. The method of claim 64, wherein each score is normalized by dividing the score by a maximum possible score for the stored case model, where the maximum possible score is determined when all of the attributes and text of the case model and the stored case model match.

* * * * *

UNITED STATES PATENT AND TRADEMARK OFFICE
CERTIFICATE OF CORRECTION

PATENT NO. : 6,411,947 B1
DATED : June 25, 2002
INVENTOR(S) : Rice et al.

It is certified that error appears in the above-identified patent and that said Letters Patent is hereby corrected as shown below:

Title page,
Item [75], Inventors, please insert -- Anthony M. Angotti, Marcellus, NY (US); Rosanna M. Piccolo, Bayside, NY (US); Fred R. Cohen, New York, NY (US); --.
Item [60], Related U.S. Application Data, please insert -- Continuation of Serial No. 08/853,074, filed May 8, 1997, now issued as 6,189,059, which claims the benefit of --.

Signed and Sealed this

Eighth Day of November, 2005

JON W. DUDAS
*Director of the United States Patent and Trademark Office*

US006411947C1

(12) EX PARTE REEXAMINATION CERTIFICATE (8106th)
United States Patent
Rice et al.

(10) Number: US 6,411,947 C1
(45) Certificate Issued: Mar. 22, 2011

(54) AUTOMATIC MESSAGE INTERPRETATION AND ROUTING SYSTEM

(75) Inventors: Amy Rice, Ridgefield, CT (US); Julie Hsu, Brooklyn, NY (US); Anthony M. Angotti, Marcellus, NY (US); Rosanna M. Piccolo, Bayside, NY (US); Fred R. Cohen, New York, NY (US)

(73) Assignee: Bright Response, LLC, Indian Wells, CA (US)

Reexamination Request:
No. 90/009,155, May 21, 2008

Reexamination Certificate for:
Patent No.: 6,411,947
Issued: Jun. 25, 2002
Appl. No.: 09/054,233
Filed: Apr. 2, 1998

Certificate of Correction issued Nov. 8, 2005.

Related U.S. Application Data (63) Continuation of application No. 08/853,074, filed on May 8, 1997, now Pat. No. 6,189,059.
(60) Provisional application No. 60/042,494, filed on Apr. 3, 1997, and provisional application No. 60/042,656, filed on Apr. 4, 1997.

(51) Int. Cl.
G06F 17/00 (2006.01)
G06F 5/02 (2006.01)

(52) U.S. Cl. .............................. 706/47; 706/46; 706/49
(58) Field of Classification Search ........................ None
See application file for complete search history.

(56) References Cited

U.S. PATENT DOCUMENTS

| 4,829,576 | A | * | 5/1989 | Porter ........................ 704/235 |
|---|---|---|---|---|
| 5,224,206 | A | | 6/1993 | Simoudis |
| 5,243,689 | A | | 9/1993 | Yoshiura |
| 5,283,887 | A | * | 2/1994 | Zachery ...................... 715/210 |
| 5,317,677 | A | | 5/1994 | Dolan |
| 5,377,354 | A | * | 12/1994 | Scannell et al. ............. 718/103 |
| 5,402,524 | A | | 3/1995 | Bauman |
| 5,418,948 | A | | 5/1995 | Turtle |
| 5,444,823 | A | | 8/1995 | Nguyen |
| 5,581,664 | A | * | 12/1996 | Allen et al. ................... 706/46 |
| 5,586,218 | A | | 12/1996 | Allen |
| 5,666,481 | A | | 9/1997 | Lewis |
| 5,699,402 | A | | 12/1997 | Bauer et al. |
| 5,720,001 | A | | 2/1998 | Nguyen |
| 5,768,353 | A | | 6/1998 | Browne |
| 5,836,771 | A | | 11/1998 | Ho |
| 5,855,015 | A | | 12/1998 | Shoham |
| 5,884,302 | A | | 3/1999 | Ho |

(Continued)

FOREIGN PATENT DOCUMENTS

| EP | 0586954 A2 | * | 8/1993 |
|---|---|---|---|
| WO | WO 92/15951 | | 9/1992 |
| WO | WO 93/21587 | | 10/1993 |
| WO | WO 95/02221 | | 1/1995 |

OTHER PUBLICATIONS

Defendants' Google Inc. et al. Invalidity Contentions of Bright Response, LLC F/K/A Polaris IP, LLC v. Google Inc., et al. Civil Action No. 2:07–cv–371–TSW–CE (pp. 1–86, including Exhibit A).

(Continued)

*Primary Examiner*—M. Steelman (57) ABSTRACT

A method of automatically interpreting an electronic message, including the steps of (a) receiving the electronic message from a source; (b) interpreting the electronic message using a rule base and case base knowledge engine; and (c) classifying the electronic message as at least one of (i) being able to be responded to automatically; and (ii) requiring assistance from a human operator. The method for automatically interpreting an electronic message may also include the step of retrieving one or more predetermined responses corresponding to the interpretation of the electronic message from a repository for automatic delivery to the source.

U.S. PATENT DOCUMENTS

| | | | |
|---|---|---|---|
| 5,899,985 | A | 5/1999 | Tanaka |
| 5,909,679 | A | 6/1999 | Hall |
| 6,058,435 | A | 5/2000 | Sassin |
| 6,078,914 | A | 6/2000 | Redfern |
| 6,085,201 | A | 7/2000 | Tso |

OTHER PUBLICATIONS

Aamodt, Case–Based Reasoning: Foundational Issues, Methodological Variations, and System Approaches, AI Communications, Mar. 1994, 39–59, vol. 7, No. 1.

Acorn et al, SMART: Support Management Automated Reasoning Technology for Compaq Customer Service, Proceeding of Fourth Annual Conference on Innovative Applications of Artificial Intelligence, 1992, AAAI Press, Menlo Park, USA.

Allen, Case–Based Reasoning: Business Applications, Communications of the ACM, Mar. 1994, vol. 37, No. 3.

Auriol, Inreca: A Seamlessly Integrated System Based on Inductive Inference and Case–Based Reasoning, Lecture Notes in Artificial Intelligence: Subseries of Lecture Notes in Computer Science, 1995, Springer–Verlag, Berlin Heidlberg.

Chang et al, A Self–Improving Helpdesk Service System Using Case–Based Reasoning Techniques, Computers in Industry, 1996, 113–125, 30.

Chi et al, An Integrated Approach of Rule–Based and Case–Based Reasoning for Decision Support, Proceedings of the $19^{th}$ Annual Conference on Computer Science, 1991, 255–267, San Antonio, USA.

Cohen, Fast Effective Rule Induction, Proceedings of the Twelfth International Conference on Machine Learning, 1995.

Cohen, Learning Rules that Classify E–Mail, Proceedings of the 1996 AAAI Spring Symposium on Machine Learning in Information Access, 1996.

Dutta et al, Integrated Case Based and Rule Based Reasoning: The Possibilistic Connection, Uncertainty in Artificial Intelligence and Law 1, 1992, 3–44, Elsevier Publishers B.V.

Fathi–Torbaghan et al, ICARUS: Intergrating Rule–Based and Case–Based Reasoning on the Base of Unsharp Symptons, IEEE International Conference on Systems, Man and Cybernetics, 1995, 2424–2427, vol. 3.

Fox, Introspective Learning for case–Based Planning, Ph.D. Thesis, Computer Science, Oct. 1995, Indiana, USA.

Golding et al, Improved Rule–Based Systems Through Case–Based Reasoning, Case–Based Reasoning, 1991, 22–27, Anaheim, USA.

Golding et al, Improving Accuracy by Combining Rule–Based and Case–Based Reasoning, Artificial Intelligence 87, Nov. 1996, 215–254.

Hall, Infomod: A Knowledge–Based Moderator for Electronic Mail Help Lists, Proceedings of the Fifth International Conference of Information and Knowledge Management, AMC, 1996, 107–114, Rockville, USA.

Hill et al, Recommending and Evaluating Choices in a Virtual Community of Use, CHI'95 Mosaic of Creativity, May 7–11, 1995, 194, Denver, USA.

Jeffries et al, Comparing a Form–Based and a Language–Based User Interface for Instructing Mail Program, ACM Sigchi Bulletin, 1987, 261–266, vol. 17.

Jurisica, Inductive Learning and Case–Based Reasoning, Canadian AI Conference, Workshop on What Is Inductive Learning?, 1996, Toronto, Canada.

Kowalski, Case–Based Reasoning and the Deep Structure Approach to Knowledge Representation, Proceedings of the Third International Conference on Artificial Intelligence and Law, 1991, 21–30.

Kriegsman et al, Building a Case–Based Help Desk Application, 1993, 18–26, vol. 8, No. 6, IEEE Expert.

Leake, CBR in Context: The Present and Future, Case–based Reasoning: Experiences, Lessons, and Future Directions, AAAI Press/MIT Press, 1996.

Lenz, Cabata– A Hybrid CBR System, Proceedings of First European Workshop on Case–Based Reasoning, EWCBR, 1993, 204–209.

Lopez et al, Case–Based Planning for Medical Diagnosis, Methodologies for Intelligent Systems, $7^{th}$ International Symposium, 1993.

Manago et al, Induction and Reasoning From Cases, First European Workshop on CBR, Seki–Report SR–93–12 University of Kaiserslautern, 1993, 313–318.

Nitta et al, Helic II–A Legal Reasoning System on the Parallel Inference Machine, Proceedings of the International Conference on Fifth Generation Computer Systems, New Generation Computing, 1992, 423–448, Ohmsha, Ltd. and Springer–Verlag.

Nguyen et al, Compaq Quicksource: Providing the Consumer with the Power of AI, AI Magazine, 1993, vol. 4, No. 3.

Popple, A Pragmatic Legal Expert System, Visiting Fellow, Dartmouth Publishing Company, 1996.

Portinale et al, Adapter: An Integrated Diagnostic System Combining Case–Based and Abductive Reasoning, Subseries of Lecture Notes in Computer Science, 1995, Springer–Verlag.

Rice et al, EZ Reader: Embedded AI for Automatic Electronic Mail Interpretation and Routing, Case Studies, 1996, 1507–1517, vol. 2.

Rissland et al, Cabaret: Rule Interpretation in a Hybrid Architecture, International Journal of Man–Machine Studies, 1991, 839–887, vol. 34.

Rissland et al, Case–Based Diagnostic Analysis in a Blackboard Architecture, Proceedings of the Eleventh International Joint Conference on Artificial Intelligence, 1993, 66.

Rissland et al, A Case–Based System for Trade Secrets Law, Proceedings of the First International Conference on Artificial Intelligence and Law, 1987, 60–67.

Rissland et al, A Hybrid CBR–1R Approach to Legal Information Retrieval, Proceedings of the Fifth International Conference on Artificial Intelligence and Law, ACM, 1995.

Rissland et al, Combining Case–Based + Rule–Based Reasoning: A Heuristic Approach, Proceedings of the Eleventh International Joint Conference on Artificial Intelligence, 1989.

Simoudis, Using Case–Based Retrieval for Customer Technical Support, 1992, 7–12, vol. 7, No. 5.

Slator et al, TaxOps: A Case–Based Advisor, International Journal of Expert Systems, 1991, 4–2, 1–18.

Skalak et al, Argument Moves in a Rule–Guided Domain, Proceedings of the $3^{rd}$ International Conference on Artificial Intelligence and Law, 1991, 1–11.

Skalak et al, Arguments and Cases: An Inevitable Intertwining, Artificial Intelligence and Law, 1992, 3–44, Kluwer Academic Publisher, Netherlands.

Surma et al, Integrating Rules and Cases for the Classification Task, Case–Based Reasoning, Research and Development, First International Case–Based Reasoning Conference, 1995, 325–334, ICCCBR '95, Springer Verlag.

Venkataraman et al, A Rule– Rule– Case Based System for Image Analysis, Proceedings of First European Workshop on Case–Base Reasoning, 1993, 410–415.

Vossos et al, An Example of Integrating Legal Case Based Reasoning with Object–Oriented Rule–Based Systems: Ikbals II, Proceedings of the Third International Conference on Artificial Intelligence and Law, 1991, 34–41.

Watson et al, Case–Based Reasoning: A Review, The Knowledge Engineering Review, 1–33, 9(4).

Watson, Case–Based Reasoning Tools: An Overview, Proceeding of the $2^{nd}$ UK Workshop on Case–Based Reasoning, Apr. 10, 1996, 71–88, AI/CBR/SGES Publications.

Whitehead, Auto–FAQ: An Experiment in Cyberspace Leveraging, Computer Networks and ISDN Systems, 1995.

Freedman, *Computer Desktop Encyclopedia, The Computer Language Company Inc.,* 1996, pp. 280, 412, 856 and 898.

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 9, 10, 14, 30-37, 50-51, 57-61, 63-65 and 66 is confirmed.

Claims 1-8, 11-13, 15-29, 38-49, 52-56 and 62 are cancelled.

New claims 67-92 are added and determined to be patentable.

67. The method of claim 31, further comprising categorizing the electronic message.

68. The method of claim 67, wherein the further categorizing the electronic message categorizes the electronic message into at least one of a plurality of sub-categories based on content of the electronic message.

69. The method of claim 68, wherein the sub-categories include product subject matter.

70. The method of claim 69, wherein the product subject matter includes product service subject matter and product sales subject matter.

71. The method of claim 31, further comprising prioritizing a sub-categorized electronic message into at least one of a plurality of priorities based on content of the electronic message.

72. The method of claim 31, wherein receiving the electronic message receives the electronic message over an electronic data communications channel.

73. The method of claim 72, wherein the electronic data communications channel is the Internet.

74. The method of claim 31, further comprising transmitting the one or more predetermined responses over an electronic data communications channel.

75. The method of claim 74, wherein the electronic data communications channel is the Internet.

76. The method of claim 31, further comprising altering the one or more predetermined responses in accordance with the interpretation of the electronic message before delivery to the source.

77. The method of claim 31, wherein the electronic message includes fixed data.

78. The method of claim 31, wherein the electronic message includes variable data.

79. The method of claim 31, wherein the interpreting comprises detecting combinations of words in the electronic message.

80. The method of claim 31, wherein the interpreting comprises detecting patterns of text in the electronic message.

81. The method of claim 31, wherein the interpreting comprises detecting combinations of text in the electronic message.

82. The method of claim 31, wherein the interpreting comprises detecting attributes in the electronic message.

83. The method of claim 31, wherein the interpreting comprises detecting predetermined attributes in the electronic message.

84. The method of claim 83, further comprising classifying the electronic message based on the detected predetermined attributes.

85. The method of claim 31, wherein the receiving receives a non-interactive message wherein the interpreting and retrieving are performed without further input from the source.

86. The method of claim 31, wherein the interpreting comprises performing rule base parsing.

87. The method of claim 31, wherein the interpreting comprises performing case based retrieval.

88. The method of claim 31, wherein the interpreting comprises identifying a case model with substantially matching attributes.

89. The method of claim 31, wherein the interpreting comprises interpreting the electronic message as being related to a product category.

90. The method of claim 31, wherein the interpreting comprises interpreting the electronic message as being related to promotional content.

91. The method of claim 90, wherein the electronic message includes an inquiry related to the promotional content.

92. The method of claim 31, wherein the receiving includes receiving the electronic message from a domain server.

* * * * *